United States Patent
Harris, Jr. et al.

(10) Patent No.: US 6,618,150 B2
(45) Date of Patent: Sep. 9, 2003

(54) COMPACT TRANSFORM SPECTROMETER BASED ON SAMPLING A STANDING WAVE

(75) Inventors: James S. Harris, Jr., Stanford, CA (US); Helen L. Kung, Stanford, CA (US); David A. B. Miller, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/932,457

(22) Filed: Aug. 16, 2001

(65) Prior Publication Data

US 2002/0075483 A1 Jun. 20, 2002

Related U.S. Application Data

(60) Provisional application No. 60/226,157, filed on Aug. 16, 2000.

(51) Int. Cl.[7] .................................................. G01B 9/02
(52) U.S. Cl. ........................................................ 356/451
(58) Field of Search ................................ 356/351, 352, 356/354; 250/339.07, 339.08

(56) References Cited

U.S. PATENT DOCUMENTS 4,859,060 A * 8/1989 Katagiri et al. ............. 356/454

OTHER PUBLICATIONS

P.M. Zavracky et al., "A Micromachined Scanning Fabry–Perot Interferometer," Proceedings of the SPIE, 3514, 1998, pp. 179.
G.M. Yee et al., "Miniature Spectrometers for Biochemical Analysis," Sensors and Actuators A– Physical, vol. 58, 1997, pp. 61.
O. Manzardo et al., "Miniaturized Time–Scanning Fourier Transform Spectrometer Based on Silicon Technology," Optics Letters, vol. 24, 1999, pp. 1705.

\* cited by examiner

Primary Examiner—Samuel A. Turner
(74) Attorney, Agent, or Firm—Lumen Intellectual Property Services, Inc.

(57) ABSTRACT

A spectrometer for determining a spectrum of a light by using a mirror to reflect the light so that the light forms an intensity standing wave pattern through superposition of an incident portion of the light and a reflected portion of the light. The spectrometer is equipped with an intensity detector whose thickness is less than a shortest wavelength of the light being examined and which is semitransparent over the spectrum. The spectrometer has a mechanism to provide relative movement between the mirror and the intensity detector such that the intensity detector registers a variation of the intensity standing wave pattern. An analyzer, such as a Fourier transform analyzer, is employed to determine the spectrum of the light from that variation of the intensity standing wave pattern.

17 Claims, 4 Drawing Sheets

COMPACT TRANSFORM SPECTROMETER BASED ON SAMPLING A STANDING WAVE

CROSS-REFERENCE TO RELATED APPLICATIONS

This application claims priority from Provisional application 60/226,157 filed Aug. 16, 2000 which is herein incorporated by reference.

FIELD OF INVENTION

The present invention relates generally to spectrometry, and in particular to a compact transform spectrometer which uses an intensity detector positioned in an intensity standing wave pattern produced by reflection to determine an optical spectrum.

BACKGROUND OF THE INVENTION

The ability to detect light and measure its intensity is important in various fields and applications. In addition to that, it is also important to be able to determine the spectrum of the light. A variety of applications, from color cameras to advanced biological sensors would benefit from small, spectrally sensitive detection systems which integrate the ability to perform both of these functions.

At present, light detection and determination of the spectrum are performed by separate devices rather than integrated spectrally sensitive detection systems. Often, such detection systems must use some external spectrometer system because the detector element itself is not spectrally selective.

MEMS technology has enabled the miniaturization of several types of spectrometers, including Fabry-Perot interferometers, as described by P. M. Zavracky et al., "A Micromachined Scanning Fabry-Perot Interferometer", Proceedings of the SPIE, 3514, 1998, pp. 179. It has also enabled the miniaturization of grating based spectrometers and Michelson Fourier-transform spectrometers as discussed by G. M. Yee et al., "Miniature Spectrometers for Biochemical Analysis", Sensors and Actuators A—Physical, Vol. 58, 1997, pp. 61 and O. Manzardo et al., "Miniaturized Time-Scanning Fourier Transform Spectrometer Based on Silicon Technology", Optics Letters, Vol. 24, 1999, pp. 1705, respectively.

Despite the recent advances, prior art miniaturized spectrometers are still not sufficiently compact to be used for many applications. Typically, these spectrometers require beam splitters and, when used in two dimensional arrays, e.g., two dimensional arrays for collecting spectral images, they require raster scanning. Also, most of the miniature prior art spectrometers are difficult to manufacture.

OBJECTS AND ADVANTAGES

Accordingly, it is a primary object of the present invention to provide a spectrometer which is compact and does not require the use of beam splitters.

It is another object of the invention to provide a compact spectrometer which can be used in two dimensional arrays for collecting spectral images without raster scanning.

Yet another object of the invention is to provide a compact transform-based spectrometer which is simple to fabricate and retains the throughput and multiplexing advantages of prior art transform spectrometers.

These and other objects and advantages will become apparent upon reading the ensuing description.

SUMMARY OF THE INVENTION

The objects and advantages set forth are achieved by a spectrometer which determines a spectrum of a light by using a mirror to reflect the light so that the light forms an intensity standing wave pattern through superposition of an incident portion of the light and a reflected portion of the light. The spectrometer is further equipped with an intensity detector whose thickness is less than a shortest wavelength in the spectrum of the light being examined. The intensity detector is also semitransparent over the spectrum. There is a mechanism for providing relative movement between the mirror and the intensity detector such that the intensity detector registers a variation of the intensity standing wave pattern. An analyzer determines the spectrum of the light from that variation of the intensity standing wave pattern.

The analyzer which determines the spectrum is a Fourier transform analyzer. The spectrum is obtained from a Fourier transform of the variation. Specifically, as the intensity detector and the mirror move with respect to one another, the amplitude of the intensity standing wave pattern varies and the Fourier transform of the resulting time domain signal determines the spectrum.

There are many possible mechanisms for providing relative movement between the intensity detector and the mirror. In one embodiment this mechanism comprises a device for moving the intensity detector. In another embodiment, the mechanism comprises a device for moving the mirror. Of course, both the mirror and the intensity detector can be moved simultaneously by different devices or by a more complex integrated mechanism. In one particular embodiment the mechanism comprises a membrane. Either the intensity detector or the mirror is mounted on the membrane. A driver is provided for oscillating the membrane to thus provide for relative movement between the intensity detector and the mirror.

The intensity detector is positioned in the path of the light such that the light passes through it first and is then incident on the mirror. In one embodiment, the intensity detector is a photoconductor deposited on a quartz wafer and the mirror is a MEMS mirror.

The invention further provides a method for determining the spectrum of light by using the variation of the intensity standing wave pattern registered by the intensity detector. The spectrum is determined from the variation by performing a Fourier transform of the variation. To simplify the transform, in a preferred embodiment the relative movement between the intensity detector and the mirror is a linear relative movement.

When the mechanism providing relative movement between the mirror and the intensity detector is an oscillating membrane it is desirable to obtain large displacement and stable motion. For this purpose the oscillation is driven substantially at a resonance of the oscillating membrane.

It is also desirable to select an intensity detector which has a substantially flat response profile of intensity versus wavelength over the spectrum. Furthermore, the mirror is preferably selected to have a substantially flat reflectivity profile over the spectrum.

The specific embodiments of the invention are described in the detailed description with reference to the attached drawing figures.

DETAILED DESCRIPTION

Figure 1:
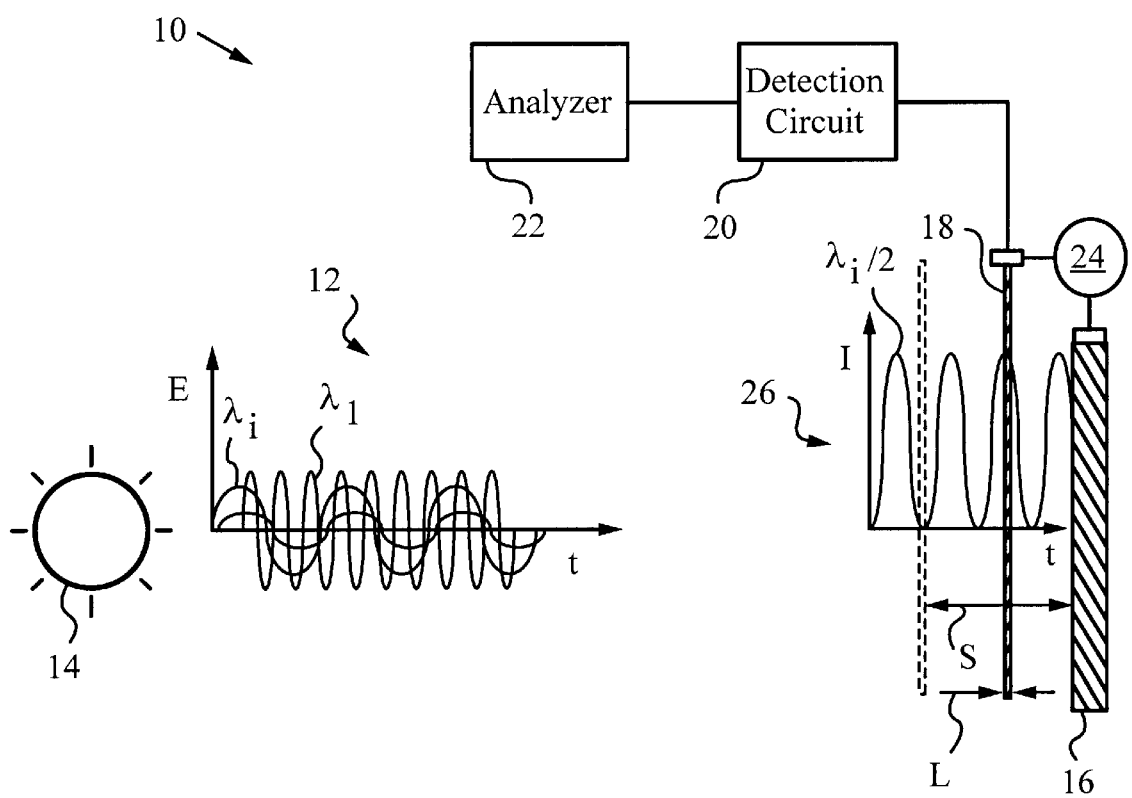
FIG. 1 is a diagram illustrating the general principles of a spectrometer according to the invention.

The principles and operation of the invention will be best understood by first examining a spectrometer 10 illustrated in FIG. 1. Spectrometer 10 has a mirror 16 for reflecting a light 12 whose spectrum is to be determined. In this embodiment, light 12 is derived from a source 14 whose spectrum is to be studied. A person skilled in the art will recognize that source 14 can be any type of device, artificial or natural, whose spectrum requires analysis or study. Also, source 14 may simply represent a portion of the ambient light whose spectrum is to be determined. In any event, it is understood that provisions are made (not shown) to ensure that light outside the spectrum to be examined or from sources other than source 14 is not admitted into spectrometer 10. Preferably the light from source 14 is arranged to be substantially collimated at spectrometer 10, traveling in a direction substantially perpendicular to the surface of mirror 16.

Light 12 contains a number of different wavelengths within the spectrum. A shortest wavelength $\lambda_1$ and an intermediate wavelength $\lambda_i$ within the spectrum are identified explicitly. In general, the electric field amplitudes of light at wavelengths $\lambda_1$ and $\lambda_i$ will differ, as apparent from FIG. 1.

An intensity detector 18 is placed in the path of light 12 and in front of mirror 16. Thus, light 12 first passes through detector 18 and is then incident on mirror 16. Detector 18 is in the form of a thin plate semitransparent to light 12. Preferably, detector 18 exhibits the same or nearly the same degree of transparency to light 12 over the entire spectrum. Detector 18 has a thickness L which is less than and preferably considerably less than shortest wavelength $\lambda_1$ of light 12. Preferably, the thickness of detector 18 is less than $\lambda_1/4n$ where n is the refractive index of the detector material.

Detector 18 is connected to a detection circuit 20 and to an analyzer 22. Detection circuit 20 can contain any suitable pre-amplification, amplification and/or compensation circuitry, as is known to those skilled in the art. Analyzer 22 is a Fourier transform analyzer.

A mechanism 24 provides relative movement between mirror 16 and detector 18. Mechanism 24 can be any suitable mechanical or electromechanical arrangement for displacing either mirror 16, detector 18 or both. MEMS techniques can be used to build appropriate mechanism 24. Relative movement provided by mechanism 24 allows one to vary a separation S between mirror 16 and detector 18. In the embodiment of FIG. 1, mechanism 24 varies separation S by displacing detector 18 only. Preferably, mechanism 24 allows for a linear variation of separation S, i.e., mechanism 24 ensures that the movement between mirror 16 and detector 18 is linear relative movement.

Spectrometer 10 operates on the principle of establishing an intensity standing wave pattern by reflecting light 12 from mirror 16 after light 12 has passed through detector 18. Specifically, the intensity standing wave pattern is established by mirror 16 through superposition of a reflected portion of light 12 on an incident portion of light 12. The complete intensity standing wave pattern is created by superpositions of incident and reflected portions of light 12 at all wavelengths contained in light 12. For clarity, FIG. 1 indicates a part 26 of the intensity standing wave pattern established by reflection at wavelength $\lambda_i$ only. It should be noted that the repeat distance of intensity standing wave pattern 26 produced by light 12 at wavelength $\lambda_i$ is one half of that wavelength, i.e., $\lambda_i/2$.

Now, separation S changes in a linear manner because of relative linear movement between detector 18 and mirror 16 introduced by mechanism 24. As detector 18 travels through intensity standing wave pattern it registers the variation in intensity at each point along the way. Specifically, detector 18 produces an intensity signal whose amplitude corresponds to intensity of the standing wave pattern and sends it to detection circuit 20. Circuit 20 amplifies and compensates the intensity signal over the spectrum to mitigate artifacts and fluctuations not due to the standing wave pattern and thus derive a net intensity signal.

The net intensity signal obtained by detection circuit 20 represents a variation of the intensity standing wave pattern as separation S between detector 18 and mirror 16 changes. In fact, this net intensity signal, which is a time domain signal, is approximately the Fourier transform of the wavelength power spectrum of light 12 when the relative movement between detector 18 and mirror 16 is linear and when compensation circuit 20 renders the sensitivity of detector 18 independent of wavelength. This net intensity signal is passed on by circuit 20 to Fourier transform analyzer 22 to obtain the Fourier components corresponding to the wavelengths making up the spectrum of light 12.

The intensity standing wave pattern perceived by detector 18 for a given wavelength of light 12 may not be the ideal form illustrated in FIG. 1 because there will be some absorption in detector 18 (or less than total reflection by mirror 16). In general, this means that the contrast in the standing wave pattern as perceived by detector 18 will be limited. For example, the intensity signal from detector 18 may not go to zero at the positions of the minima in the standing wave pattern. However, the amplitude of a particular frequency component in the intensity signal output by detector 18 will still be representative of the power at a chosen wavelength. A person skilled in the art will know how to design circuit 20 to properly compensate for these effects.

The incident power at any particular wavelength in the spectrum of light 12 can be measured by multiplying the intensity signal output by detector 18 by an appropriate time-varying signal and averaging or integrating the result. For the case of a linear scan with the separation S changing at a rate of v meters per second, the appropriate time-varying signal to measure the power at a particular wavelength, e.g., at $\lambda_i$, is a sine wave of frequency $f=2v/\lambda_i$ cycles per second. The precise phase of this sine wave will depend upon the phase change on reflection from mirror 16, but can preferably be chosen empirically to substantially maximize the integrated or averaged result.

Figure 2A:
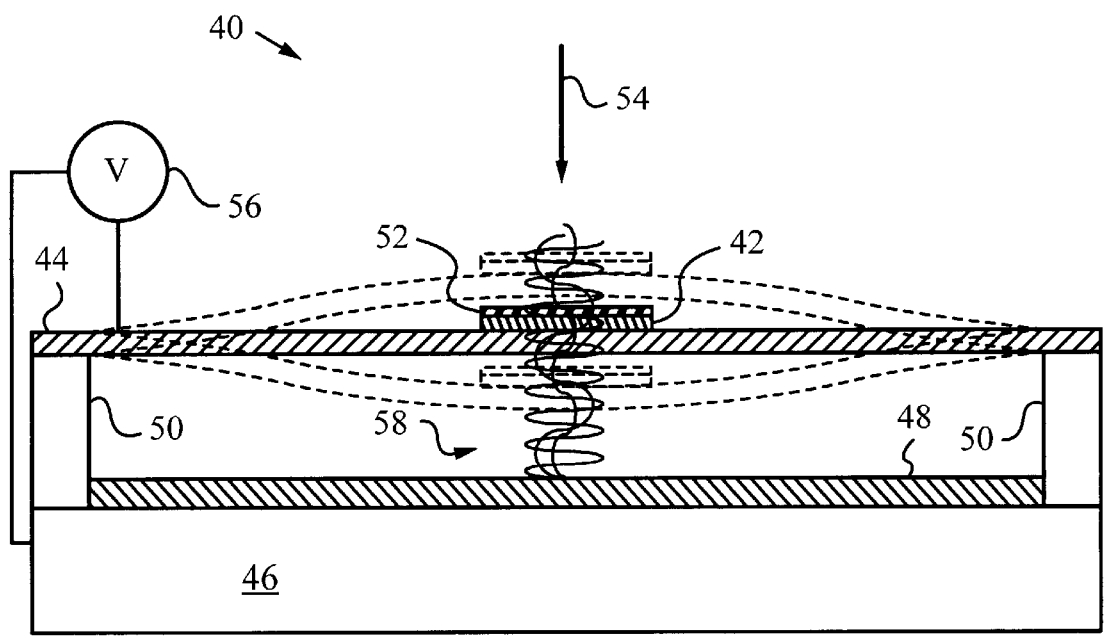
FIG. 2A is a cross-sectional side view of a spectrometer with an intensity detector mounted on an oscillating membrane.

The spectrometer of invention is particularly well-suited to micromechanical implementations. FIG. 2A illustrates in cross-sectional side view a spectrometer 40 in which an intensity detector 42 is mounted on an oscillating membrane 44. Membrane 44 is flexible and is designed to be brought into oscillation, thus moving detector 42. Therefore, in this embodiment membrane 44 is the mechanism for providing relative motion between detector 42 and a mirror 48.

Spectrometer 40 is built up on a substrate 46 which can be made of a silicon wafer or other suitable material. Mirror 48 in the form of a layer of reflective material such as Au is deposited on substrate 46 directly underneath intensity detector 42. Mirror 48 extends past the boundaries of detector 42.

Pedestals 50 are formed on substrate 46 by any suitable growing technique. Alternatively, pedestals 50 can be formed by etching away the central portion of substrate 46 down to the level at which mirror 48 is deposited. Pedestals 50 support membrane 44.

A suitable driver, in this case a variable voltage source 56 is used to apply a voltage between substrate 46 and membrane 44, thus producing an electrostatic attraction between membrane 44 and substrate 46. This electrostatic attraction is used to drive membrane 44 into oscillation. Of course, when this technique is used to apply a voltage between substrate 46 and membrane 44 pedestals 50 have to be made of an electrical insulator.

Detector 42 is covered by a layer of anti-reflection coating 52. By providing detector 42 with coating 52 undesired reflection of a light 54 entering spectrometer 40 is minimized. Preferably, coating 52 exhibits the same level of anti-reflectivity over the entire spectrum of light 54 to be examined.

During operation, light 54 enters spectrometer 40 by passing through anti-reflective coating 52, detector 42 and membrane 44. Consequently, membrane 44 is made of a material transparent to light 54. Preferably, the material of membrane 44 is selected to exhibit the same degree of transparency over the entire spectrum of light 54.

An intensity standing wave pattern 58 is established by reflection of light 54 from mirror 48 in accordance with the principles explained above. Now, membrane 44 is driven to oscillate by driver 56, thereby moving detector 42 through standing wave pattern 58. In order to ensure the most efficient movement of detector 42 membrane 44 is preferably driven near or at resonance. By doing this it is possible to obtain large distance of travel or displacement and stable motion of detector 42. When driven at resonance, the displacements will be approximately linear in time for usable portions of the range of the displacement. Alternatively an appropriately altered time-varying signal can be used that compensates for the nonlinear change of displacement with time.

As in the above embodiment, detector 42 registers the changing intensity of the standing wave pattern at each point and produces a corresponding intensity signal. Suitable electronics (not shown) can be used to compensate this intensity signal to obtain a net intensity signal before determining the spectrum of light 54 therefrom. Alternatively, intensity signal from detector 42 can be used directly by forwarding it to a Fourier transform analyzer (not shown) to determine the spectrum of light 54.

Figure 2B:
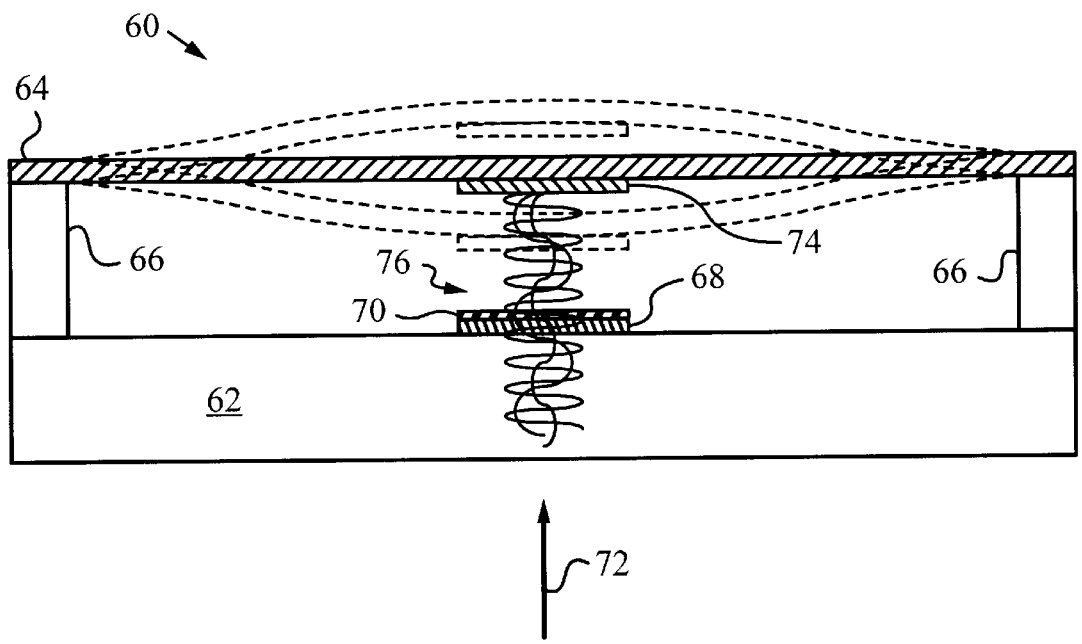
FIG. 2B is a cross-sectional side view of a spectrometer with a mirror mounted on an oscillating membrane.

FIG. 2B illustrates a preferred embodiment of a spectrometer 60 built up on a substrate 62. Substrate 62 is made of a material transmissive to a light 72 whose spectrum is to be determined. Preferably, substrate 62 is made of a material whose transmittance is substantially equal or flat over the spectrum of light 72.

Spectrometer 60 has an oscillating membrane 64 mounted on pedestals 66. In contrast to spectrometer 40, spectrometer 60 has a mirror 74 mounted on membrane 64. A detector 68 is deposited directly on substrate 62 below mirror 74 and is covered by an anti-reflection coating 70.

Light 72 is admitted into spectrometer 60 through substrate 62. After passing through substrate 62, detector 68 and coating 70, light 72 is reflected by mirror 74 and an intensity standing wave pattern 76 is established. Now, when membrane 64 is driven into oscillation (e.g., by electrostatic attraction between substrate 62 and membrane 64 induced by a voltage source or another suitable mechanism) mirror 74 is displaced and standing wave pattern 76 moves. It is preferable to drive the oscillation of membrane 64 near or at a resonance to obtain large displacement and stable motion of mirror 74.

As mirror 74 moves, detector 70 scans through standing wave pattern 76 and registers the intensity variation in standing wave pattern 76. As in the above embodiment, detector generates a corresponding intensity signal and a Fourier transform of this signal yields the spectrum of light 72. A more precise spectrum can be obtained by performing the Fourier transform of a net intensity signal compensated for fluctuations in intensity over the spectrum, non-linear scanning motion of detector 68 through standing wave pattern 76 and any other adverse effects.

A person skilled in the art will recognize that many types of micromechanical structures including more complex integrated mechanisms can be devised in which either the mirror or the detector (or both) are moved. For example, it is possible to employ oscillating cantilever structures to move either the mirror or the detector (or both) through the intensity standing wave pattern.

Figure 3:
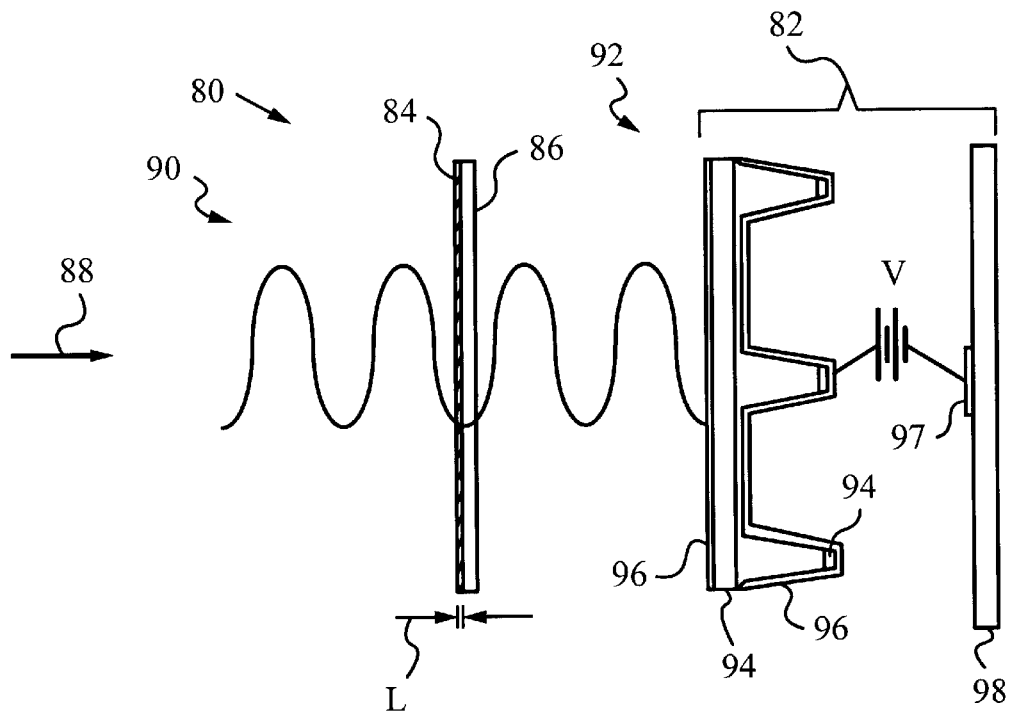
FIG. 3 is a cross-sectional side view of a spectrometer with a movable MEMS mirror.

FIG. 3 illustrates a spectrometer 80 using a MEMS mirror 82. Spectrometer 80 uses a photoconductor 84 deposited on a quartz wafer 86 as the intensity detector. Photoconductor 84 has a thickness L that is smaller than a shortest wavelength in the spectrum of a light 88 and it partially transmits light 88. Transmitted light 88 hits a movable MEMS mirror 82 and the reflected and forward waves are superposed, generating an intensity standing wave pattern 90. The standing wave pattern 90 is detected by thin film photoconductor 84. As mirror 82 moves, the amplitude of standing wave pattern 90 at photoconductor 84 varies. The Fourier transform of the resulting time domain signal determines the optical spectrum.

In a particular embodiment, provided for example purposes only, photoconductor 84 is fabricated by depositing 1000 Å of intrinsic amorphous silicon (a-Si) by low pressure chemical vapor deposition (LPCVD) onto quartz wafer 86. 200 Å of p-doped a-Si is grown on top of the i a-Si for ohmic contacts. 1000 Å of gold is then evaporated onto the material in a metal-semiconductor-metal pattern with finger and spacing width of 40 $\mu$m. Photoconductor 84 has a dark resistivity of 4.2 M$\Omega$; when illuminated with 1 mW of 633 nm light (HeNe) it has a resistivity of 3.4 M$\Omega$. At this wavelength ~50% of the incoming light is reflected by the gold fingers of the detector, and total power transmission is ~30%. The maximum operating speed of the detector is less than 7 kHz; this is a consequence of the finger spacing and the material properties of the LPCVD a-Si.

MEMS mirror 82 is fabricated by depositing ~1 $\mu$m of LPCVD low-stress silicon nitride 94 onto both sides of a double-side-polished <100>4-inch silicon wafer 92. Wafer 92 is then patterned and the nitride is removed from the exposed areas by plasma dry-tech. Wafer 92 is then placed in a bath of potassium hydroxide to etch the exposed silicon down to a thickness of ~20 μm. Mirror 82 is then coated on both sides with a 2000 Å thick layer 96 of gold. A back plane is fabricated by depositing gold 97 onto a silicon wafer 98.

Figure 4:
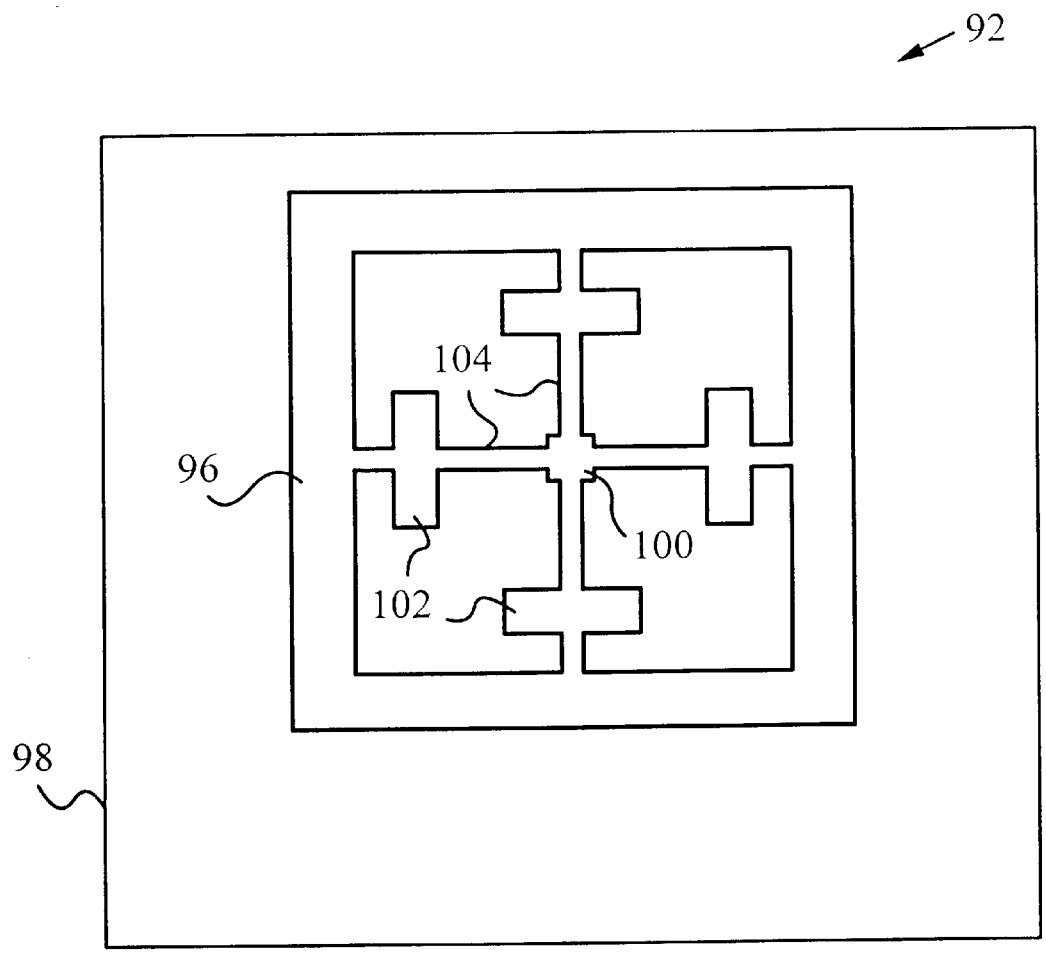
FIG. 4 is a top view of the MEMS mirror of the spectrometer of FIG. 3.

A diagram of the front plane mask is shown in FIG. 4. A central inner square 100 and outer square 102 are 2 mm and 13 mm on a side, respectively. Connecting arms 104 are designed such that they bend rather than stretch, allowing central square 100 reflective surface to move large distances when an electrostatic force is applied.

Mirror 82 is driven by applying an amplified voltage across the front and back planes of the mirror structure, and the parallel surfaces are attracted. The outer border is fixed, so only the center square 100 moves toward the back plane. This attraction is countered by a restoring force due to the deformation of the thin arm segments 104 that connect the outer border to the center. Mirror 82 has a mechanical resonance at approximately 700 Hz. When mirror 82 is driven on resonance with a drive voltage of 215 $V_{pp}$ the maximum displacement of central mirror 100 is 65 μm.

Figure 5:
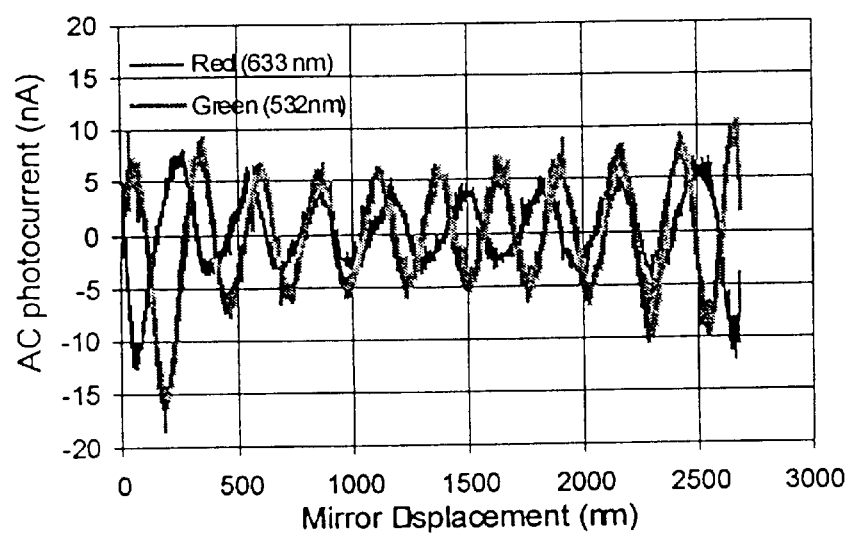
FIG. 5 is a graph of AC photocurrent registered by the intensity detector versus mirror displacement for red and green laser light coupled separately into the spectrometer of FIG. 3.

In one embodiment spectrometer mirror 82 was run on resonance for large displacement and more stable motion. Photoconductor 84 was biased at 15 V. The intensity signal from the photoconductor 84 was passed through a 3.39 kHz high-pass filter to remove the DC components dark current, first pass absorption, ambient light, and amplified with a total gain of $10^7$ V/A. Spectrometer 80 was tested separately with two sources: a small HeNe laser at 633 nm and a diode-pumped solid-state laser (Spectra-Physics Millenium) at 532 nm, each attenuated to ~2 mW. Given the photoconductor's 84 speed limitations, the total displacement of central mirror 100 was 2.7 μm, which corresponded to 37 $V_{pp}$ applied across mirror 82. For each source there is a graph of the AC photocurrent signal versus displacement of the mirror, as shown in FIG. 5. It is apparent that there is a new interference fringe for every λ/2 mirror displacement, as expected.

Figure 6A:
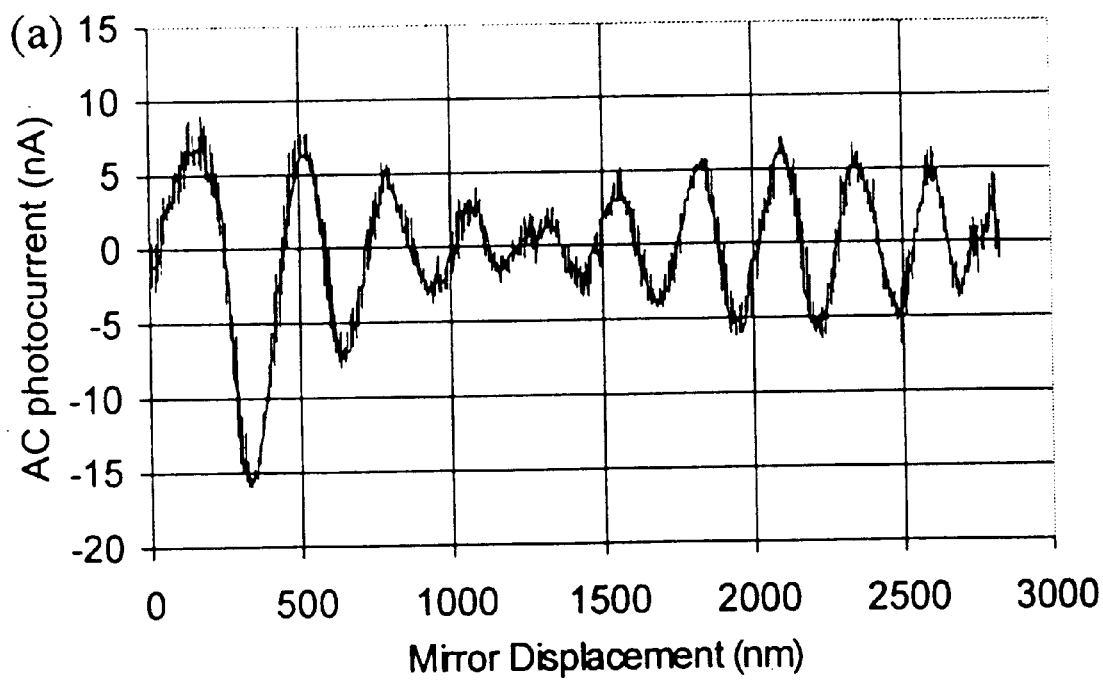
FIG. 6A is a graph of AC photocurrent registered by the intensity detector versus mirror displacement for red and green light coupled simultaneously into the spectrometer of FIG. 3.
Figure 6B:
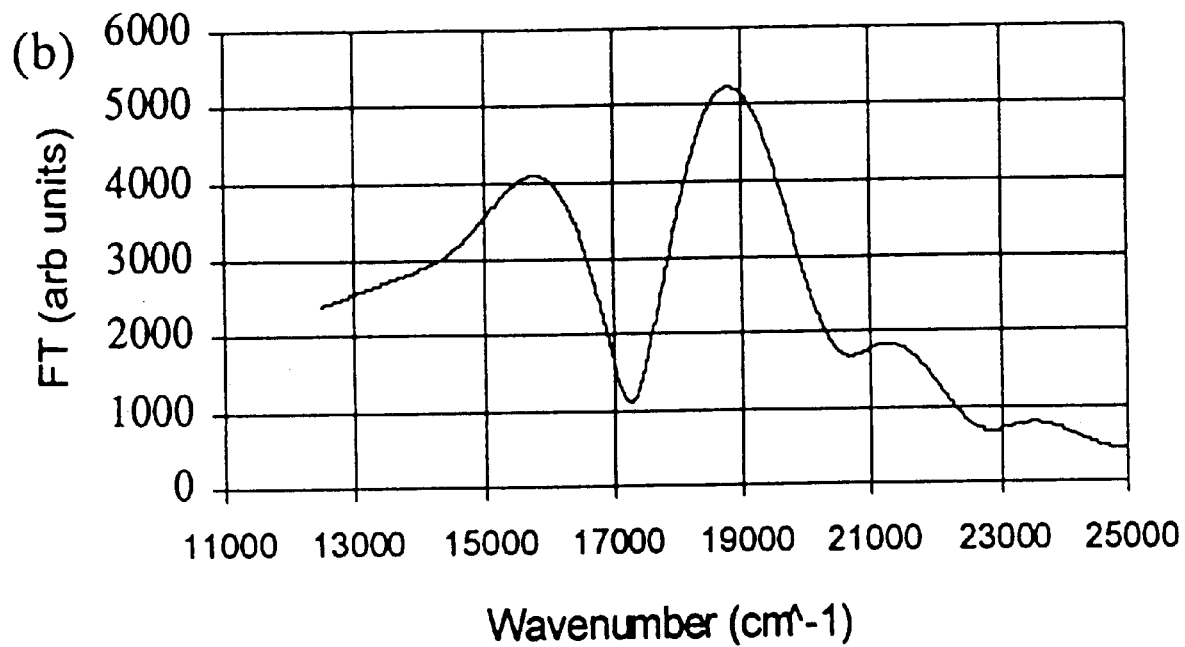
FIG. 6B is a graph corresponding to the Fourier transform of the AC photocurrent in FIG. 6A.

When both red and green sources are incident on spectrometer 80 simultaneously there is a beat frequency in the photocurrent curve, as shown in FIG. 6(a). The Fourier transform of FIG. 6(a) is shown in FIG. 6(b); peaks at 633 nm and 531 nm correspond to the frequencies of the two laser sources. The two peaks are broadened compared to the true frequencies of the lasers due to the fact that the total mirror displacement was only 2.7 μm. For this displacement the fundamental resolution using unapodized even-intensity delta functions to represent the lasers is 1852 cm$^{-1}$[4]. The two wavelengths are separated by 3000 cm$^{-1}$ but they are not of even intensity. Since the operation is in a regime beyond the minimum resolution requirement, the two frequency components are resolved. In general, the resolution of transform spectrometer 80 sampling standing wave pattern 90 at a moving mirror 82 is limited by the speed of photoconductor 84. If photoconductor 84 were capable of running at speeds greater than 170 kHz, then the maximum resolution, determined by the maximum displacement of this long-throw MEMS mirror 82, would be 77 cm$^{-1}$. A person skilled in the art will recognize that this embodiment can be improved by making a faster and more transparent photoconductor 84, and integrating both parts of the MEMS mirror 82 and thin-film photoconductor 84 into a single packaged device.

An alternative embodiment of the photodetector would be to fabricate a thin absorbing region from III–V materials such as GaAs, AlGaAs, InGaAs, InP, GaInAsN or other III–V materials well known to those skilled in the art. One exemplary method of fabricating such a structure is described in the article "Wavelength-Selective Photodetector Based on a Quantum Well in a Standing Wave" by L. Carraresi et al., Applied Physics Letters, Vol. 64, pp. 134–136 (1994), hereby incorporated by reference. It is understood that the fixed mirror and opaque substrate in that structure would be removed for use in the present invention, and appropriate electrical contact made to the n-doped layer in the structure. This article describes a thin GaAs layer embedded in the undoped "i" region of a p-i-n diode otherwise fabricated from materials, such as AlGaAs, that are substantially transparent over a wavelength range of interest.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. A spectrometer for determining a spectrum of a light, said spectrometer comprising:
   a) a mirror for reflecting said light to form an intensity standing wave pattern through superposition of an incident portion and a reflected portion of said light;
   b) an intensity detector having a thickness less than a shortest wavelength in said spectrum and being semi-transparent over said spectrum;
   c) a mechanism for providing relative movement between said mirror and said intensity detector, such that said intensity detector registers a variation of said intensity standing wave pattern; and
   d) an analyzer for determining said spectrum from said variation.

2. The spectrometer of claim 1, wherein said analyzer is a Fourier transform analyzer and said spectrum is obtained from a Fourier transform of said variation.

3. The spectrometer of claim 1, wherein said mechanism comprises a device for moving said intensity detector.

4. The spectrometer of claim 1, wherein said mechanisms comprises a device for moving said mirror.

5. The spectrometer of claim 1, wherein said mechanism comprises a membrane.

6. The spectrometer of claim 5, wherein one of said intensity detector and said mirror is mounted on said membrane.

7. The spectrometer of claim 6, further comprising a driver for oscillating said membrane.

8. The spectrometer of claim 1, wherein said intensity detector is positioned in the path of said light such that said light passes through said intensity detector and is then incident on said mirror.

9. The spectrometer of claim 1, wherein said intensity detector is a photoconductor on a quartz wafer.

10. The spectrometer of claim 1, wherein said mirror is a MEMS mirror.

11. A method for determining a spectrum of a light, said method comprising:
   a) providing a mirror for reflecting said light to form an intensity standing wave pattern through superposition of an incident portion and a reflected portion of said light;
   b) providing an intensity detector having a thickness less than a shortest wavelength in said spectrum and being semitransparent over said spectrum;

c) moving said mirror and intensity detector relative to each other, such that said intensity detector registers a variation of said intensity standing wave pattern; and d) determining said spectrum from said variation.

12. The method of claim 11, wherein said spectrum is determined from a Fourier transform of said variation.

13. The method of claim 11, wherein said moving comprises a linear relative movement.

14. The method of claim 11, wherein said moving comprises an oscillation of one of said intensity detector and said mirror on an oscillating membrane.

15. The method of claim 14, wherein said oscillation is driven substantially at a resonance of said oscillating membrane.

16. The method of claim 11, wherein said intensity detector is selected to have a substantially flat response profile of intensity versus wavelength over said spectrum.

17. The method of claim 11, wherein said mirror is selected to have a substantially flat reflectivity profile over said spectrum.

* * * * *